(12) United States Patent
Kunii

(10) Patent No.: US 8,958,749 B2
(45) Date of Patent: Feb. 17, 2015

(54) COMMUNICATION APPARATUS AND COMMUNICATION SYSTEM

(75) Inventor: Tadahiro Kunii, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1291 days.

(21) Appl. No.: 12/038,762

(22) Filed: Feb. 27, 2008

(65) Prior Publication Data

US 2008/0207130 A1    Aug. 28, 2008

(30) Foreign Application Priority Data

Feb. 28, 2007    (JP) ................................. 2007-050660

(51) Int. Cl.
*H04B 17/00* (2006.01)
*H04B 15/00* (2006.01)

(52) U.S. Cl.
CPC ........ *H04B 17/0042* (2013.01); *H04B 17/0065* (2013.01); *H04B 17/0077* (2013.01); *H04B 17/0085* (2013.01)
USPC .......................... 455/62; 455/63.3; 455/452.1

(58) Field of Classification Search
USPC ................. 455/62, 63.1, 63.3, 452.1
See application file for complete search history.

(56) References Cited

U.S. PATENT DOCUMENTS

| | | | |
|---|---|---|---|
| 4,309,773 A * | 1/1982 | Johnson et al. | 455/62 |
| 5,822,315 A * | 10/1998 | de Seze et al. | 370/337 |
| 7,006,451 B2 | 2/2006 | Kuwahara | |
| 7,773,998 B2 | 8/2010 | Ikegami | |
| 2001/0018333 A1 * | 8/2001 | Klenner | 455/115 |
| 2002/0071407 A1 * | 6/2002 | Koo et al. | 370/335 |
| 2002/0080739 A1 | 6/2002 | Kuwahara | |
| 2003/0202500 A1 * | 10/2003 | Ha et al. | 370/342 |
| 2003/0227935 A1 * | 12/2003 | Alapuranen | 370/437 |
| 2003/0228890 A1 * | 12/2003 | Falaki | 455/574 |
| 2004/0237016 A1 * | 11/2004 | Sudo | 714/748 |

(Continued)

FOREIGN PATENT DOCUMENTS

| | | |
|---|---|---|
| JP | H06-224837 A | 8/1994 |
| JP | 2002-198867 A | 7/2002 |

(Continued)

OTHER PUBLICATIONS

Japan Patent Office, Notification of Reason for Refusal for Japanese Patent Application No. 2007-050660 (counterpart to above-captioned patent application), mailed Dec. 7, 2010.

*Primary Examiner* — Nay A Maung
*Assistant Examiner* — Erica Fleming-Hall
(74) *Attorney, Agent, or Firm* — Baker Botts L.L.P.

(57) ABSTRACT

A communication apparatus including a first communicator which communicates with a first other communication apparatus, a detector which detects, with respect to each of the frequency channels, a value of a parameter for evaluating a quality of a communication between the communication apparatuses, a determiner which determines, on the basis of the value of the parameter detected with respect to a corresponding one of the frequency channels by the detector, whether the quality of the communication between the communication apparatuses made by using each of the frequency channels is not less than a first threshold, and a communication controller which sends the first other communication apparatus data by means of the first communicator, once when a good-quality frequency channel is used, and repeatedly a plurality of times when a poor-quality frequency channel is used.

13 Claims, 7 Drawing Sheets

(56) References Cited

U.S. PATENT DOCUMENTS

| | | | |
|---|---|---|---|
| 2004/0266469 A1* | 12/2004 | Hayashi et al. | 455/522 |
| 2005/0010850 A1* | 1/2005 | Driessen et al. | 714/758 |
| 2005/0031059 A1* | 2/2005 | Moore et al. | 375/346 |
| 2005/0135253 A1* | 6/2005 | Cai et al. | 370/236 |
| 2005/0141463 A1* | 6/2005 | Ando | 370/335 |
| 2005/0197131 A1 | 9/2005 | Ikegami | |
| 2005/0201453 A1* | 9/2005 | Gu | 375/225 |
| 2005/0271021 A1* | 12/2005 | Alemany et al. | 370/338 |
| 2006/0013130 A1* | 1/2006 | Bloebaum | 370/229 |
| 2006/0034240 A1* | 2/2006 | Kwak et al. | 370/342 |
| 2006/0069613 A1* | 3/2006 | Marquardt | 705/14 |
| 2006/0193391 A1* | 8/2006 | Borran et al. | 375/260 |
| 2006/0245357 A1* | 11/2006 | Ilan | 370/235 |
| 2006/0250960 A1* | 11/2006 | Ando | 370/233 |
| 2007/0002742 A1* | 1/2007 | Krishnaswamy et al. | 370/235 |
| 2007/0019551 A1* | 1/2007 | Pozhenko et al. | 370/235 |
| 2007/0124626 A1* | 5/2007 | Lee et al. | 714/704 |
| 2008/0170508 A1* | 7/2008 | Popiak et al. | 370/252 |
| 2008/0170528 A1* | 7/2008 | Bosch et al. | 370/312 |
| 2009/0150738 A1 | 6/2009 | Nishio et al. | |

FOREIGN PATENT DOCUMENTS

| | | |
|---|---|---|
| JP | 2003-163651 A | 6/2003 |
| JP | 2003-163652 A | 6/2003 |
| JP | 2005-244330 A | 9/2005 |
| WO | 2006/046586 A1 | 5/2006 |

\* cited by examiner

FIG.7

| BER VALUE | EQUAL TO OR HIGHER THAN 1/100 | 1/100~1/500 | 1/500~1/1000 | LOWER THAN 1/1000 |
|---|---|---|---|---|
| COMMUNICATION NUMBER | 5 | 3 | 2 | 1 |

FIG.8

| BER VALUE | EQUAL TO OR HIGHER THAN 1/100 | 1/100~1/500 | 1/500~1/1000 | LOWER THAN 1/1000 |
|---|---|---|---|---|
| COMMUNICATION NUMBER | USE IS CEASED | 3 | 2 | 1 |

COMMUNICATION APPARATUS AND COMMUNICATION SYSTEM

CROSS REFERENCE TO RELATED APPLICATION

The present application claims priority from Japanese Patent Application No. 2007-050660, which was filed on Feb. 28, 2007, the disclosure of which is herein incorporated by reference in its entity.

BACKGROUND OF THE INVENTION

1. Field of the Invention

The present invention relates to a communication apparatus and a communication system, and particularly to a communication apparatus and a communication system which can maintain an excellent communication quality while minimizing a reduction in the number of usable frequency channels.

2. Description of Related Art

There is known a communication apparatus wirelessly communicating with another apparatus (which may be referred to as "an apparatus at the other end") by utilizing FHSS (frequency-hopping spread spectrum) technology as a communication method. According to FHSS technology, a frequency of a carrier wave is changed or hopped in a cycle during a communication is made, that is, both a transmitting apparatus that sends out data and a receiving apparatus that receives the sent data identically change the frequency, or identically switch a channel to use among a plurality of channels, to keep a communication established.

More specifically, there is employed a FHSS method in which 79 channels are defined across a broadband of 2.4 GHz (2402-2480 MHz) with frequency intervals of 1 MHz, and, in the case of a cordless telephone, the channel switching is implemented at a rate of 100 times per second during a communication. When there is a radio wave of the same frequency in the air while the communication apparatus is making a communication, a problem occurs in the communication.

A technique to prevent such a problem is disclosed in JP-A-2002-198867 (see paragraph [0008]). That is, a data error rate is detected with respect to each of a plurality of frequency channels, and compared to a threshold. A frequency channel the data error rate of which is higher than the threshold is determined to be an interference channel which is a channel where interference occurs, and use of the interference channel is automatically ceased.

According to the technique where use of the frequency channel with a high data error rate is automatically ceased to decrease the number of usable channels, a shortage of usable frequency channels may occur depending on a value at which the threshold is set.

SUMMARY OF THE INVENTION

This invention has been developed in view of the above-described situations, and it is an object of the invention, therefore, to provide a communication apparatus and a communication system which can maintain an excellent communication quality while minimizing a reduction in the number of usable frequency channels.

To attain the above object, the invention provides communication apparatuses and a communication system of the followings modes (1)-(8).

(1) A communication apparatus comprising:

a first communicator which communicates with a first other communication apparatus by using a plurality of frequency channels defined within a frequency band such that the frequency channels are switched from one to another;

a detector which detects, with respect to each of the frequency channels, a value of a parameter for evaluating a quality of a communication between the communication apparatuses;

a determiner which determines, on the basis of the value of the parameter detected with respect to a corresponding one of the frequency channels by the detector, whether the quality of the communication between the communication apparatuses made by using each of the frequency channels is not poorer than a first threshold; and at least one of (a) a communication controller which sends the first other communication apparatus data by means of the first communicator, once when a good-quality frequency channel is used, and repeatedly a plurality of times when a poor-quality frequency channel is used, the good-quality frequency channel being the frequency channel the quality of the communication made by using which is determined by the determiner to not be poorer than the first threshold, and the poor-quality frequency channel being the frequency channel the quality of the communication made by using which is determined by the determiner to be poorer than the first threshold, and (b) a requester which requests, by means of the first communicator, the first other communication apparatus to send data to the communication apparatus, once when the good-quality frequency channel is used, and repeatedly a plurality of times when the poor-quality frequency channel is used.

According to the communication apparatus of the mode (1), when the communication apparatus wirelessly communicates with the first other communication apparatus (which may be simply referred to as "first other apparatus" hereinafter) by using the frequency channels defined within a frequency band such that the frequency channel used is switched from one to another among the frequency channels, the value of the parameter used for evaluating the quality of the communication between the communication apparatuses is detected with respect to each of the frequency channels in order to determine whether the quality of the communication made by using each frequency channel is not poorer than the threshold on the basis of the value of the parameter detected with respect to the frequency channel. When a frequency channel the quality of the communication made using which is determined to not be poorer than the threshold is used, data is sent to the first other apparatus once, and/or the first other apparatus is requested to send data to the communication apparatus, once. On the other hand, when a frequency channel the quality of the communication made using which is determined to be poorer than the threshold is used, data is sent to the first other apparatus repeatedly a plurality of times, and/or the first other apparatus is requested to send data a plurality of times. Thus, an excellent communication quality can be maintained while minimizing a reduction in the number of usable frequency channels. That is, when the quality of the communication made by using a frequency channel is determined to be poorer than the threshold, use of the frequency channel is not ceased, but data is sent repeatedly a plurality of times through the frequency channel. Hence, the number of usable frequency channels does not decrease, and thus it is inhibited that the possibility that interference with another radio wave occurs increases due to the cease of use of a frequency channel or channels. Further, the sending data repeatedly a plurality of times as the need arises contribute to maintaining the excellent communication quality.

(2) The communication apparatus according to the mode (1), comprising the communication controller.

(3) The communication apparatus according to the mode (2), further comprising the requester.

(4) The communication apparatus according to any one of the modes (1)-(3), wherein at least one other threshold is set at a value lower than the first threshold in order that a plurality of regions corresponding to a plurality of quality ranks are defined by the thresholds, wherein the determiner determines which rank the quality of the communication made by using each poor-quality frequency channel falls within, and wherein the communication controller sends the first other communication apparatus the data such that the number of times to send the data increases as the quality rank of the poor-quality frequency channel used lowers.

According to the communication apparatus of the mode (4), even when a frequency channel of a lower quality rank is used, an excellent communication quality can be maintained.

(5) The communication apparatus according to any one of the modes (1)-(4), wherein at least one other threshold is set at a value lower than the first threshold in order that a plurality of regions corresponding to a plurality of quality ranks are defined by the thresholds, and the communication controller ceases to use a frequency channel which is determined by the determiner to fall within the lowest quality rank.

According to the communication apparatus according to the mode (4), the number of times the data is repeatedly sent increases as the quality rank of the poor-quality frequency channel used lowers. However, when the data is sent an excessively large number of times, the time taken to send the data as a whole and to implement a relevant signal processing becomes too long. Hence, when the quality of the communication made by using a frequency channel falls within the lowest quality rank, it is desirable to cease to use the frequency channel for making a communication.

(6) The communication apparatus according to any one of the modes (1)-(5), wherein the detector detects, as the value of the parameter, a data error rate of the data received from the first other communication apparatus.

In the present invention, the term "data error rate" covers a wide range of meanings including at least "code error rate" or "bit error rate", and "packet error rate".

According to the communication apparatus of the mode (6), the quality of the communication made through each frequency channel can be easily detected.

(7) The communication apparatus according to any one of the modes (1)-(6), further comprising a second communicator which is different from the first communicator and communicates with a second other communication apparatus by using a frequency channel defined within the frequency band.

According to the communication apparatus of the mode (7), even when the first communicator and the second communicator happen to simultaneously use a same frequency channel, the qualities of the communications made by both the first and second communicators are kept high. Hence, the communication apparatus can wirelessly communicate with a second other communication apparatus, in addition to the first other communication apparatus.

(8) A communication system including a base unit and a cordless handset at least one of which is constituted by the communication apparatus according to any one of the modes (1)-(7).

According to the communication system of the mode (8) the base unit and the cordless handset wirelessly communicate with each other, the effects obtained by the communication apparatus according to the corresponding mode (1)-(7) can be obtained by at least one of the base unit and the cordless handset.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 7 is a table illustrating a communication-number setting implemented in the MFP and the cordless handset according to another embodiment of the invention.

FIG. 8 is a table illustrating a communication-number setting implemented in the MFP and the cordless handset according to another embodiment of the invention.

DETAILED DESCRIPTION OF PREFERRED EMBODIMENTS

Hereinafter, there will be described presently preferred embodiments of the invention, by referring to the accompanying drawings.

Figure 1:
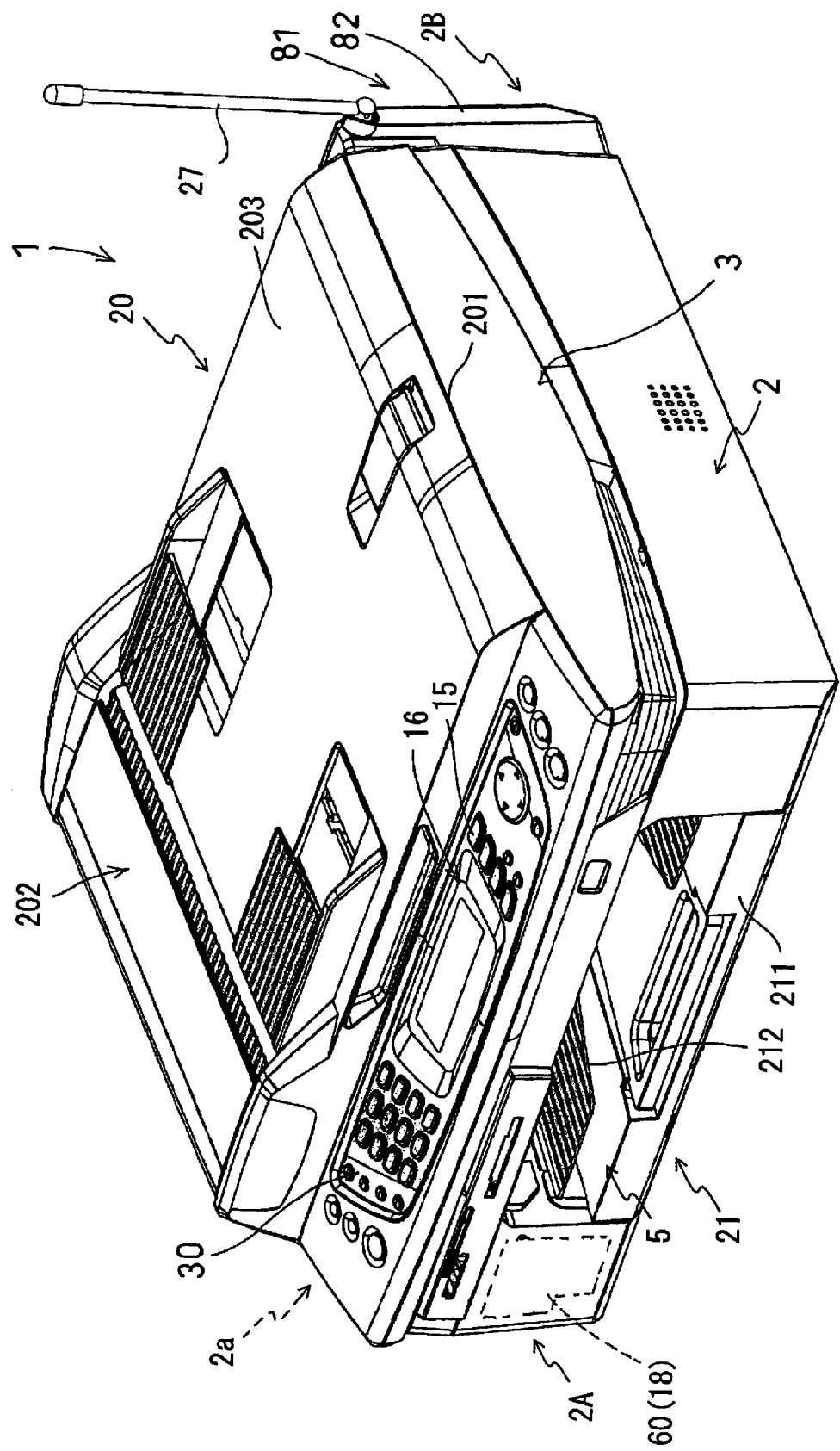
FIG. 1 is an external view of a MFP including a communication apparatus according to one embodiment of the invention.

Initially, a multifunction peripheral apparatus (hereinafter referred to as MFP) 1 including a communication apparatus according to one embodiment of the invention will be described with reference to FIGS. 1 and 2. FIG. 1 is an external view of the MFP 1.

The MFP 1 has various functions such as speech-communication function, facsimile function, printer function, scanner function, and copy function. In this embodiment, the MFP 1 takes the form of a base unit of a digital cordless telephone system, and is used mainly for making a speech communication with a digital cordless handset 31 (shown in FIG. 3) of the digital cordless telephone system and an external apparatus (not shown) connected with the digital cordless telephone system via a telephone line network 100 (shown in FIG. 3). The MFP 1 can also function as a communication apparatus capable of data communication with an access point 51 (shown in FIG. 3) by a wireless communication method defined in wireless LAN standards.

As shown in FIG. 1, the MFP 1 includes a main housing 2 and an upper housing 3. The main housing 2 is box-shaped and open on the upper side. The upper housing 3 is attached to the main housing 2 at a lateral side (i.e., at the left-hand side as seen in FIG. 1) to be vertically movable with respect to the main housing 2 such that the upper housing 3 is turned around a pivot shaft portion (not shown) such as hinge or hinge portion. The main housing 2 and the upper housing 3 are formed of synthetic resin by injection molding.

At a front side of the upper housing 3 (i.e., the lower side as seen in FIG. 1), an operation panel 30 is disposed. The operation panel 30 includes a manual operation portion 15 having numerical buttons, a communication start button, a function button, and others. A user manipulates the first manual operation portion 15 to power on/off the MFP 1, select a function to be implemented, and input various instructions.

The operation panel 30 further includes a first display portion 16 that may be a liquid crystal display (LCD). On the first display portion 16 are presented a menu, the operation status, and others, in response to a manipulation of the first manual operation portion 15. That is, the user manipulates the manual manipulation portion 15 to have information that corresponds to the manipulation presented on the first display portion 16. Thus, the user can view various kinds of information such as communication statuses between the MFP 1 and the access point 51 and between the MFP 1 and the cordless handset 31.

In the upper housing 3, a scanner portion 20 is disposed on the rear side (i.e., on the upper side as seen in FIG. 1) of the operation panel 30. The scanner portion 20 includes a document reading table 201 functioning as a FBS (Flatbed Scanner), and a document cover 203 having an ADF (Auto Document Feeder) 202. The document cover 203 is attached to the document reading table 201 at a rear side by means of a hinge (not shown) such that the document cover 203 is movable or openable/closable relative to the document reading table 201. Although not shown, a platen glass is disposed at an upper surface of the document reading table 201, and an image reading unit is disposed inside the document reading table 201.

On the other hand, in the main housing 2 is disposed a printer portion 21, which is an image recording apparatus of inkjet type that records an image on a recording sheet by selectively ejecting ink droplets on the basis of image data read by the scanner portion 20 or inputted from an external device. It is noted, however, that the image recording apparatus or the printer portion may not be of inkjet type, but various other recording methods such as electrophotography or thermal transfer can be employed as a method of image recording.

At the front side of the MFP 1 or of the printer portion 21, an opening 5 is formed. In the opening 5 is extractably inserted a sheet supply cassette 211, on which a plurality of recording sheets are stacked. Over the sheet supply cassette 211 is disposed a sheet catch tray 212 onto which a recording sheet on which an image has been recorded is ejected.

Inside the main housing 2 and inside the printer portion 21, a sheet feed path extends upward from a rear side of the sheet supply cassette 211 and then turns frontward in a U-like shape to be connected to the sheet catch tray 212. In the printer portion 2, a sheet supply unit and a printhead (neither shown) are also disposed. The sheet supply unit supplies or picks up the recording sheets one by one from the rear side of the sheet supply cassette 211. The printhead is disposed in the sheet feed path and ejects ink droplets onto a surface of the recording sheet being fed along the sheet feed path to record an image.

On a left side wall 2a of the main housing 2, a base handset 24 (shown in FIG. 3) and a support portion (not shown) that supports the base handset 24 while the MFP 1 is in a standby mode are disposed, so as to enable a speech communication with the cordless handset 31 or with an external apparatus through the telephone line network 100. Thus, the MFP 1 is constituted by a main body and the support portion A wireless communication unit 81 is attached to a right rear end portion of the main housing 2. The wireless communication unit 81 includes a casing 82 of synthetic resin, and accommodates a communication board (not shown) including a first digital-cordless-communication control portion 26 (shown in FIG. 3), detailed description of which will be provided later. In brief, the first digital-cordless-communication control portion 26 wirelessly connects the base handset 24 of the MFP 1 as the base unit to the cordless handset 31 as another handset located at a position remote from the MFP 1, and has a first cordless-phone antenna 27 protruding from the casing 82 to transmit and receive signals.

As described above, the MFP 1 has the base handset 24 attached to the MFP 1 as the base unit, and the wireless communication unit 81 that wirelessly connects the base handset 24 to the cordless telephone 31. Thus, the base handset 24 and the cordless handset 31 are selectively used as desired, and further a communication can be made between the base handset 24 and the cordless handset 31.

The main housing 2 has four corners including a corner 2A and a corner 2B that are opposed to each other. A wireless communication unit board (or a wireless LAN board) 60 including a wireless LAN communication control portion 18 (shown in FIG. 3), and a main circuit board (not shown) for electrically controlling an operation of devices included in the MFP 1, are disposed inside the corner 2A. The wireless communication unit 81 accommodating the communication board including the first digital-cordless-communication control portion 26 is attached to the corner 2B.

According to the MFP 1, the main circuit board the wireless LAN board 60 including the wireless LAN communication control portion 18 and the main circuit board are disposed apart from the wireless communication unit 81 accommodating the communication board including the digital cordless communication control portion 26, as described above. Thus, the wireless LAN board 60 including the wireless LAN communication control portion 18, the communication board including the digital cordless communication control portion 26, and the main circuit board do not tend to suffer from noise.

Figure 2:
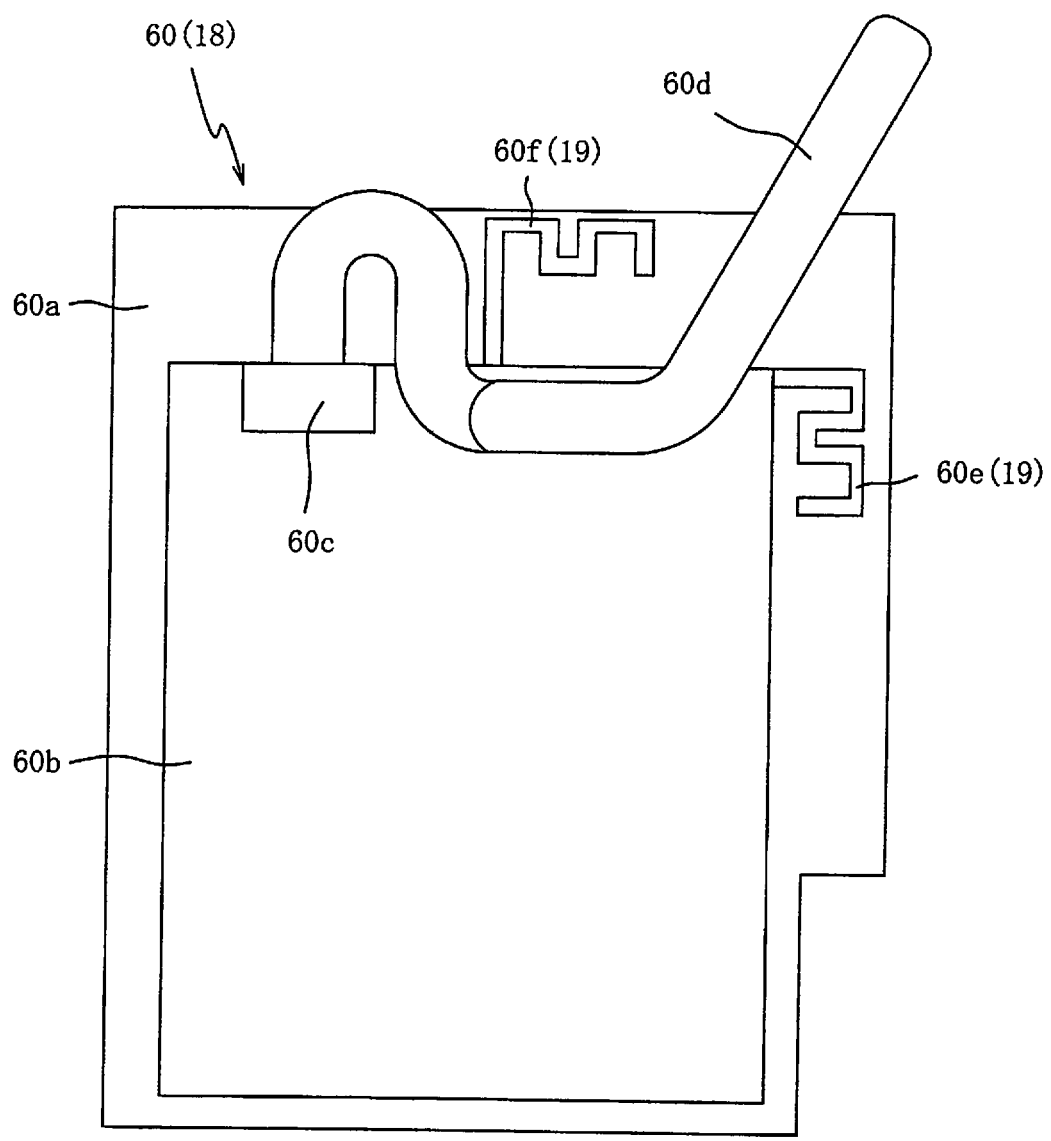
FIG. 2 is a front elevational view of a wireless LAN board.

FIG. 2 is a front elevational view of the wireless LAN board 60 including the wireless LAN communication control portion 18. As shown in FIG. 2, the wireless LAN board 60 is constructed such that a circuit module 60b is mounted on a surface of a glass epoxy substrate 60a with a connector 60c disposed at a portion of the circuit module 60b. A harness 60d for wiring is detachably connected with the connector 60c.

As shown in FIG. 2, a main antenna portion 60e and a sub antenna portion 60f are formed on the surface of the substrate 60a and in the vicinity of the circuit module 60b. The main antenna portion 60e is disposed at a lateral side of the circuit module 60b, and the sub antenna portion 60f is disposed at an upper side of the circuit module 60b. The main and sub antenna portions 60e and 60f cooperate to constitute a wireless LAN antenna 19 (shown in FIG. 3), by means of which the wireless LAN communication control portion 18 and the access point 51 are wirelessly connected to each other.

Main sources of noise are a power source board (not shown) and the communication board including the digital cordless communication control portion 26. The first cordless-phone antenna 27 is connected with the communication board including the digital cordless communication control portion 26. Since the first cordless-phone antenna 27 is adapted to communications using intense radio waves, the first cordless-phone antenna 27 can be a high noise source particularly.

According to the MFP 1, however, the wireless LAN board 60 is disposed at the front left corner 2A of the main housing 2, and the communication board including the first digital-cordless-communication control portion 26 is disposed at the opposing corner, i.e., the rear right corner 2B of the main housing 2. Thus, inside a single housing, namely, the main housing 2, of the MFP 1, the wireless LAN board 60 is positionally separated as much as possible from the communication board including the digital cordless communication control portion 26, in order that the wireless LAN board 60 does not tend to be adversely affected by the communication board including the digital cordless communication control portion 26. This arrangement is employed as an effective countermeasure to noise.

Figure 3:
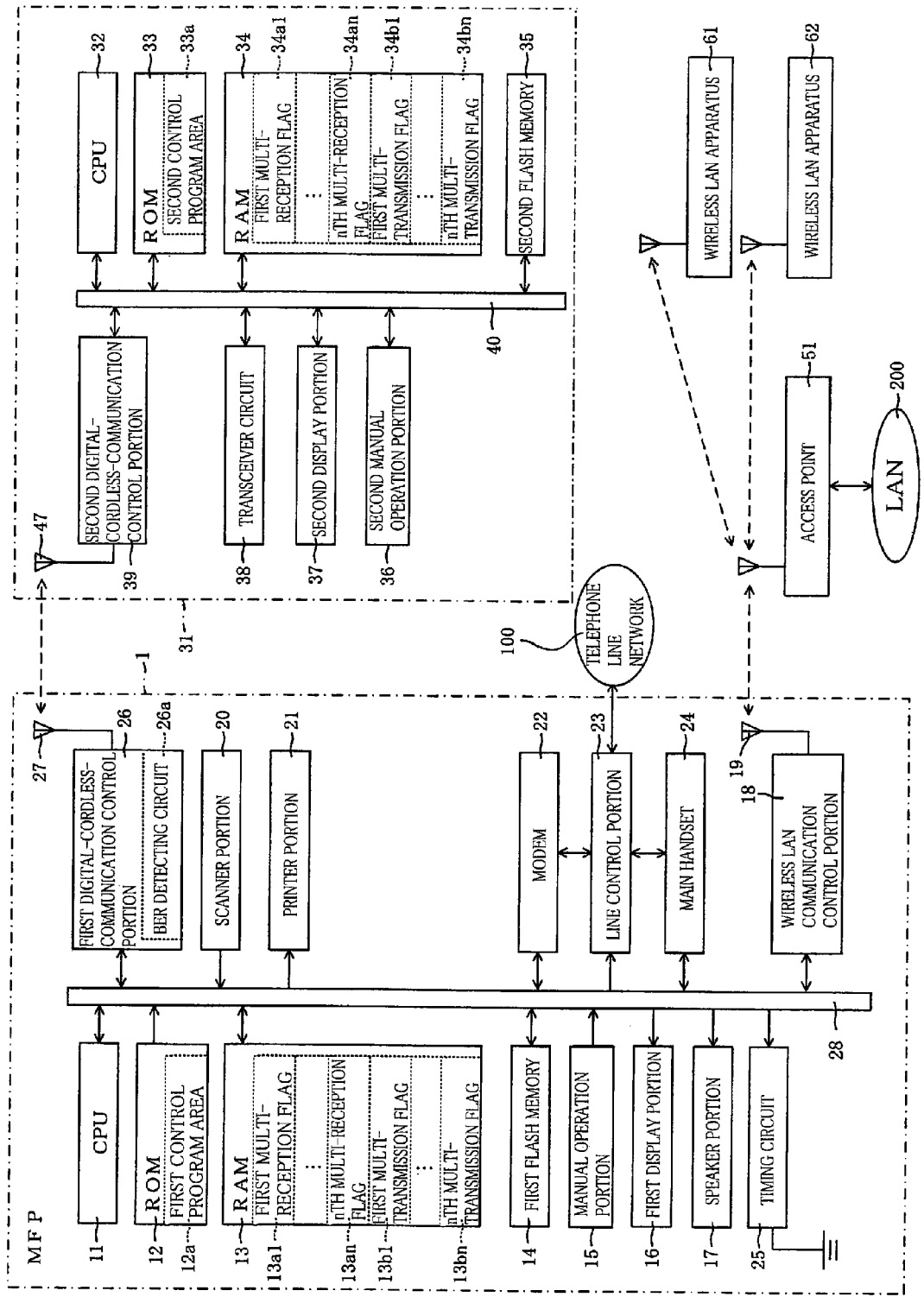
FIG. 3 is a block diagram of an electrical structure of the MFP and a cordless handset.

Referring next to FIG. 3, which is a block diagram illustrating an electrical structure of the MFP 1 and the cordless handset 31. The cordless handset 31 is a communication apparatus according to an embodiment of the invention, similarly to the MFP 1. Further, the MFP 1 and the cordless handset 31 cooperate to constitute a communication system according to an embodiment of the invention.

As shown in FIG. 3, the MFP 1 mainly includes a first CPU 11, a first ROM 12, a first RAM 13, a first flash memory 14, the first manual operation portion 15, the first display portion 16, a speaker portion 17, the wireless LAN communication control portion 18, the wireless LAN antenna 19, the scanner portion 20, the printer portion 21, a modem 22, a line control portion 23, the base handset 24, a timing circuit 25, and the digital cordless communication control portion 26. These members 11-26 are connected with one another through a first bus line 28.

The first CPU 11 is an arithmetic unit that controls the members connected with one another via the first bus line 28, in accordance with fixed values and programs stored in the first ROM 12, the first RAM 13, and the first flash memory 14, or in accordance with various kinds of signals communicated through the wireless LAN communication control portion 18, the line control portion 23, and the digital cordless communication control portion 26.

The first ROM 12 is a memory not rewritable and includes a first control program area 12a where various kinds of control programs executed in the MFP 1 are stored. The control programs stored in the first control program area 12a include programs for implementing processings illustrated in FIGS. 4 and 6A and described later.

The first RAM 13 is a rewritable memory for temporarily storing various kinds of data. The first RAM 13 has a number n of multi-reception flags 13a1-13an, i.e., a first multi-reception flag 13a1, a second multi-reception flag 13a2, . . . and a nth multi-reception flag 13an, and a number n of multi-transmission flags, i.e., a first multi-transmission flag 13b1, a second multi-transmission flag 13b2, . . . and a nth multi-transmission flag 13bn.

The first to nth multi-reception flags 13a1-13an are assigned to respective frequency channels that are used when the MFP 1 functions as a digital cordless telephone and makes a wireless communication with the cordless handset 31 by utilizing FHSS technology.

Each of the multi-reception flags 13a1-13an indicates a number of times a data piece is transmitted from the cordless handset 31 to the MFP 1 through a corresponding one of the channels. In other words, the multi-reception flag 13a1-13an indicates whether a number of times a data piece is to be received by the MFP 1 from the cordless handset 31 through a corresponding channel is set at one or two. The value of the multi-reception flag 13a1-13an is "OFF" when the number of times a data piece is received from the cordless handset 31 is set at one, and the value of the multi-reception flag 13a1-13an is "ON" when the number of times a data piece is received from the cordless handset 31 is set at two.

For instance, the value of the first multi-reception flag 13a1 being "ON" means that the number of times a data piece is received by the MFP 1 through one of the channels which is associated with the first multi-reception flag 13a1 is set at two, and the value of the second multi-reception flag 13a2 being "OFF" means that the number of times a data piece is received by the MFP 1 through another channel which is associated with the second multi-reception flag 13a2 is set at one.

The values of the multi-reception flags 13a1-13an are initialized or set to "OFF" when the MFP 1 is turned on, and suitably set to one of "ON" and "OFF" depending on the value of a bit error rate (BER) (described later) in a communication-number setting processing (shown in FIG. 4 and described later) that is repeatedly executed at predetermined time intervals, e.g., 10 seconds.

The first to nth multi-transmission flags 13b1-13bn are assigned to respective frequency channels that are used when the MFP 1 functions as the digital cordless telephone and makes a wireless communication with the cordless handset 31 by utilizing FHSS technology.

Each of the multi-transmission flags 13b1-13bn indicates whether a number of times the MFP 1 transmits a data piece to the cordless handset 31 through a corresponding one of the channels is set at one or two. The value of the multi-transmission flag 13b1-13bn is "OFF" when the number of times a data piece is transmitted to the cordless handset 31 is set at one, and the value of the multi-transmission flag 13b1-13bn is "ON" when the number of times a data piece is transmitted to the cordless handset 31 is set at two.

For instance, the value of the first multi-transmission flag 13b1 being "ON" means that the number of times a data piece is transmitted to the cordless handset 31 through one of the channels which is associated with the first multi-transmission flag 13b1 is set at two, and the value of the second multi-reception flag 13b2 being "OFF" means that the number of times a data piece is transmitted to the cordless handset 31 through another channel which is associated with the second multi-transmission flag 13b2 is set at one.

The values of the multi-transmission flags 13b1-13bn are initialized or set to "OFF" when the MFP 1 is turned on, and thereafter suitably set to one of "ON" and "OFF" depending on the value of the BER in the communication-number setting processing repeatedly executed at predetermined time intervals, e.g., 10 seconds.

The first flash memory 14 is a rewritable non-volatile memory. Data stored in the first flash memory 14 is retained after the MFP 1 is turned off. The speaker portion 17 outputs various kinds of sounds depending on the situations to inform the user of the situations. For instance, the various kinds of sounds include an operation sound outputted when the first manual operation portion 15 is manipulated, an alarm sound outputted when an error occurs, and a ring alert outputted when a call is incoming.

The scanner portion 20 operates to read an image on a document sheet set on the document reading table 201. The first display portion 16 can present the image, and printable data of the image can be generated on the basis of which the printer portion 21 can record the image. The data of the image read by the scanner portion 20 is stored in a predetermined memory area in the first RAM 13 in a case where the MFP 1 is placed in one of a facsimile mode, a scanner mode, and a copy mode. The printer portion 21 operates to record an image on a recording sheet supplied from the sheet supply cassette 211 on the basis of an instruction from the first CPU 11.

The modem 22 modulates data to be transmitted that is stored in the first RAM 13, into an image signal transmittable to the telephone line network 100, and sends the modulated data to the telephone line network 100 through the line control portion 23. The modem 22 also receives an image signal inputted from the telephone line network 100 through the line control portion 23, and demodulates the image signal into image data that can be presented on the first display portion 16 or recordable by the printer portion 21. The line control portion 23 is connected with the telephone line network 100, and operates to send a dial signal to the telephone line network 100 and respond to a ring signal from the telephone line network 100.

The base handset 24 is used for making a speech communication with the cordless handset 31 or an external apparatus (not shown) connected with the MFP 1 via the telephone line network 100. The base handset 24 has a microphone and a speaker (neither shown). The microphone converts a sound into an audio signal and outputs the audio signal to the circuit control portion 23, and the speaker converts an audio signal inputted from the circuit control portion 23 into a sound and outputs the sound to the external space.

The base handset 24 is electrically connected to the line control portion 23 or the first digital-cordless-communication control portion 26 when the base handset 24 is pickup up or lifted off the support portion of the MFP 1, that is, when an "off-hook" operation is made. When the base handset 24 is replaced onto the support portion of the MFP 1, that is, when an "on-hook" operation is made, the base handset 24 is disconnected from the line control portion 23 or the digital cordless communication control portion 26. The timing circuit 25 is a known circuit that has an internal clock representing the current time and calculates a time period by comparing a time at which a counting of time is commenced to the current time.

The first digital-cordless-communication control portion 26 constitutes a part of the communication board, and is connected with the first cordless-phone antenna 27. When the base handset 24 and the first digital-cordless-communication control portion 26 are connected to each other as a result of an off-hook operation of the base handset 24 or for other reasons, the MFP 1 and the cordless handset 31 are wirelessly connected to each other.

In the present embodiment, the MFP 1 and the cordless handset 31 wirelessly communicates with each other by a FHSS method, according to which 79 channels are defined across a broadband of 2.4 GHz (2402-2480 MHz) with frequency intervals of 1 MHz and the channel switching is implemented at a rate of 100 times per second during a communication.

When an audio signal is sent from the base handset 24 to the digital cordless communication control portion 26, the audio signal is converted into a digital signal for communication and outputted or sent to the cordless handset 31. On the other hand, when a digital signal for communication is received from the cordless handset 31, the digital signal is converted into an audio signal and outputted to the base handset 24.

The first digital-cordless-communication control portion 26 includes a BER detecting circuit 26a, which detects a BER (Bit Error Rate) as one of parameters used for evaluation of the communication quality. The lower the value of the BER is, the better the communication quality is. In this specific example, the BER is detected with respect to each of all the frequency channels. A frequency channel of which the BER value is 1/1000 or higher is determined to be an interference channel. Through each interference channel, a data piece is sent two times. On the other hand, through the other channels not determined to be an interference channel, a data piece is sent once. In place of the BER, a packet error rate or a S/N ratio may be used for evaluation of the communication quality.

The first digital-cordless-communication control portion 26 further includes a first frequency-hopping control portion (not shown) including a hopping pattern table, a hopping counter, and a clock, for implementing a wireless communication with the cordless handset 31 by the FHSS method.

The wireless LAN communication control portion 18 constitutes a part of the wireless LAN board 60, and is connected with the wireless LAN antenna 19 including the main antenna portion 60e and the sub antenna portion 60e. The wireless LAN communication control portion 18 is wirelessly connected with the access point 51 as a wireless LAN station thorough the wireless LAN antenna 19. Thus, the MFP 1 can make a data communication with wireless LAN terminals 61, 62 that are wirelessly connected with the access point 51.

The wireless LAN communication control portion 18 is wirelessly connected with the access point 51 via the wireless LAN antenna 19, and with a LAN 200 via the access point 51. Thus, the MFP 1 can make a data communication with an external apparatus (not shown) connected to the LAN 200.

The access point 51 is a wireless LAN device known as a communication device and wirelessly connected with a plurality of wireless LAN apparatuses such as the MFP 1 and the wireless LAN terminals 61, 62, so as to function as a relay device for connecting these wireless LAN apparatuses to the LAN 200.

On the other hand, as shown in FIG. 3, the cordless handset 31 mainly includes a second CPU 32, a second ROM 33, a second RAM 34, and a second flash memory 35, a second manual operation portion 36, a second display portion 37, a transceiver circuit 38, and a second digital-cordless-communication control portion 39. These members 32-39 are connected with one another through a second bus line 40.

The second CPU 32 is an arithmetic unit that controls the members connected with one another via the second bus line 40, in accordance with fixed values and programs stored in the second ROM 33, the second RAM 34, and the second flash memory 35, or in accordance with various kinds of signals communicated through the wireless LAN communication control portion 39.

The second ROM 33 is a memory not rewritable and includes a second control program area 33a where various kinds of control programs executed in the cordless handset 31 are stored. The control programs stored in the second control program area 33a include programs for implementing processings illustrated in FIGS. 5 and 6B and described later.

The second RAM 34 is a rewritable memory for temporarily storing various kinds of data. The second RAM 34 has a number n of multi-transmission flags $34a1$-$34an$, i.e., a first multi-reception flag $34a1$, a second multi-reception flag $34a2$, . . . and a nth multi-reception flag $34an$, and a number n of multi-transmission flags, i.e., a first multi-transmission flag $34b1$, a second multi-transmission flag $34b2$, . . . and a nth multi-transmission flag $34bn$.

The first to nth multi-reception flags $34a1$-$34an$ are assigned to respective frequency channels that are used when the cordless handset 31 functions as a digital cordless telephone and makes a wireless communication with the MFP 1 by the FHSS method.

Each of the multi-reception flags $34a1$-$34an$ indicates whether a number of times a data piece is transmitted from the MFP 1 to the cordless handset 31 through a corresponding one of the channels is set at one or two. The value of the multi-reception flag 34a1-34an is "OFF" when the number of times a data piece is received from the MFP 1 is set at one, and the value of the 34a1-34an flag is "ON" when the number of times a data piece is received from the MFP 1 is set at two.

For instance, the value of the first multi-reception flag 34a1 being "ON" means that the number of times a data piece is received by the cordless handset 31 through one of the channels which is associated with the first multi-reception flag 34a1 is set at two, and the value of the second multi-reception flag 34a2 being "OFF" means that the number of times a data piece is received by the cordless handset 31 through another channel which is associated with the second multi-reception flag 34a2 is set at one.

The values of the multi-reception flags 34a1-34an are initialized or set to "OFF" when the cordless handset 31 is turned on, and thereafter suitably set to one of "ON" and "OFF" depending on a request from the MFP 1 as an apparatus at the other end.

The first to nth multi-transmission flags 34b1-34bn assigned to respective frequency channels that are used when the cordless handset 31 functions as the digital cordless telephone and makes a wireless communication with the MFP 1 by the FHSS method.

Each of the multi-transmission flags 34b1-34bn indicates whether a number of times the cordless handset 31 transmits a data piece to the MFP 1 through a corresponding one of the channels is set at one or two. The value of the multi-transmission flag 34b1-34bn is "OFF" when the number of times a data piece is transmitted to the MFP 1 is set at one, and the value of the multi-transmission flag 34b1-34bn is "ON" when the number of times a data piece is transmitted to the MFP 1 is set at two.

For instance, the value of the first multi-transmission flag 34b1 being "ON" means that the number of times a data piece is transmitted to the MFP 1 through one of the channels which is associated with the first multi-transmission flag 34b1 is set at two, and the value of the second multi-reception flag 34b2 being "OFF" means that the number of times a data piece is transmitted to the MFP 1 through another channel which is associated with the second multi-transmission flag 34b2 is set at one.

The values of the multi-transmission flags 34b1-34bn are initialized or set to "OFF" when the cordless handset 31 is turned on, and thereafter suitably set to one of "ON" and "OFF" depending on a request from the MFP 1 as the apparatus at the other end.

The second flash memory 35 is a rewritable non-volatile memory. Data stored in the second flash memory 35 is retained after the cordless handset 31 is turned off. The second manual operation portion 36 is manipulated when the user inputs an instruction related to management of the cordless handset 31, and when a speech communication is made between the cordless handset 31 and the MFP 1 or an external apparatus (not shown) connected to the cordless handset 31 via the MFP 1 and the telephone line network 100. The second manual operation portion 36 has numerical buttons (or a numeric keypad), a communication start button, a function button, and others. The second display portion 37 operates, when a manipulation to manage the cordless handset 31 is made, and when a speech communication between the cordless handset 31 and the MFP 1 or an external apparatus is made, to present a telephone number inputted through the second manipulation portion 36, and various kinds of information during a speech communication. For instance, the second display portion 37 is constituted by a display device such as LCD.

The transceiver circuit 38 is a device for enabling a speech communication with the MFP 1 or an external apparatus (not shown) connected to the cordless handset 31 via the telephone line network 100. The transceiver circuit 38 is connected with a microphone and a speaker (neither shown). The microphone converts a sound into an audio signal and inputs the audio signal to the transceiver circuit 38. The speaker converts the audio signal inputted from the transceiver circuit 38 into a sound and outputs the sound to the external space. The speaker also outputs various kinds of sounds depending on the situations to inform the user of the situations. For instance, the various kinds of sounds include an operation sound outputted when the second manual operation portion 36 is manipulated, an alarm sound outputted when an error occurs, and a ring alert outputted when a call is incoming.

The transceiver circuit 38 is connected to the second digital-cordless-communication control portion 39 when the user manipulates the second manual operation portion 36 in order to start a speech communication. The transceiver circuit 38 is disconnected from the second digital-cordless-communication control portion 39 when the user manipulates the second manual operation portion 36 in order to terminate the speech communication.

With the second digital-cordless-communication control portion 39, a second cordless-phone antenna 47 is connected. When the transceiver circuit 38 and the second digital-cordless-communication control portion 39 are connected to each other by the manipulation of the second manual operation portion 36 to start a speech communication, or by other means, a wireless communication is established between the cordless handset 31 and the MFP 1. The wireless communication is established between the cordless handset 31 and the MFP 1 by the FHSS method as described above.

When an audio signal is sent to the second digital-cordless-communication control portion 39 from the transceiver circuit 38, the second digital-cordless-communication control portion 39 converts the audio signal into a digital signal for wireless communication, which is sent out or outputted to the MFP 1. On the other hand, when a digital signal for wireless communication as sent from the MFP 1 is received by the second digital-cordless-communication control portion 39, the second digital-cordless-communication control portion 39 converts the digital signal into an audio signal, which is outputted to the transceiver circuit 38.

The second digital-cordless-communication control portion 39 includes a second frequency-hopping control portion (not shown) including a hopping pattern table, a hopping counter, and a clock, for implementing a wireless communication with the MFP 1 by the FHSS method.

Figure 4:
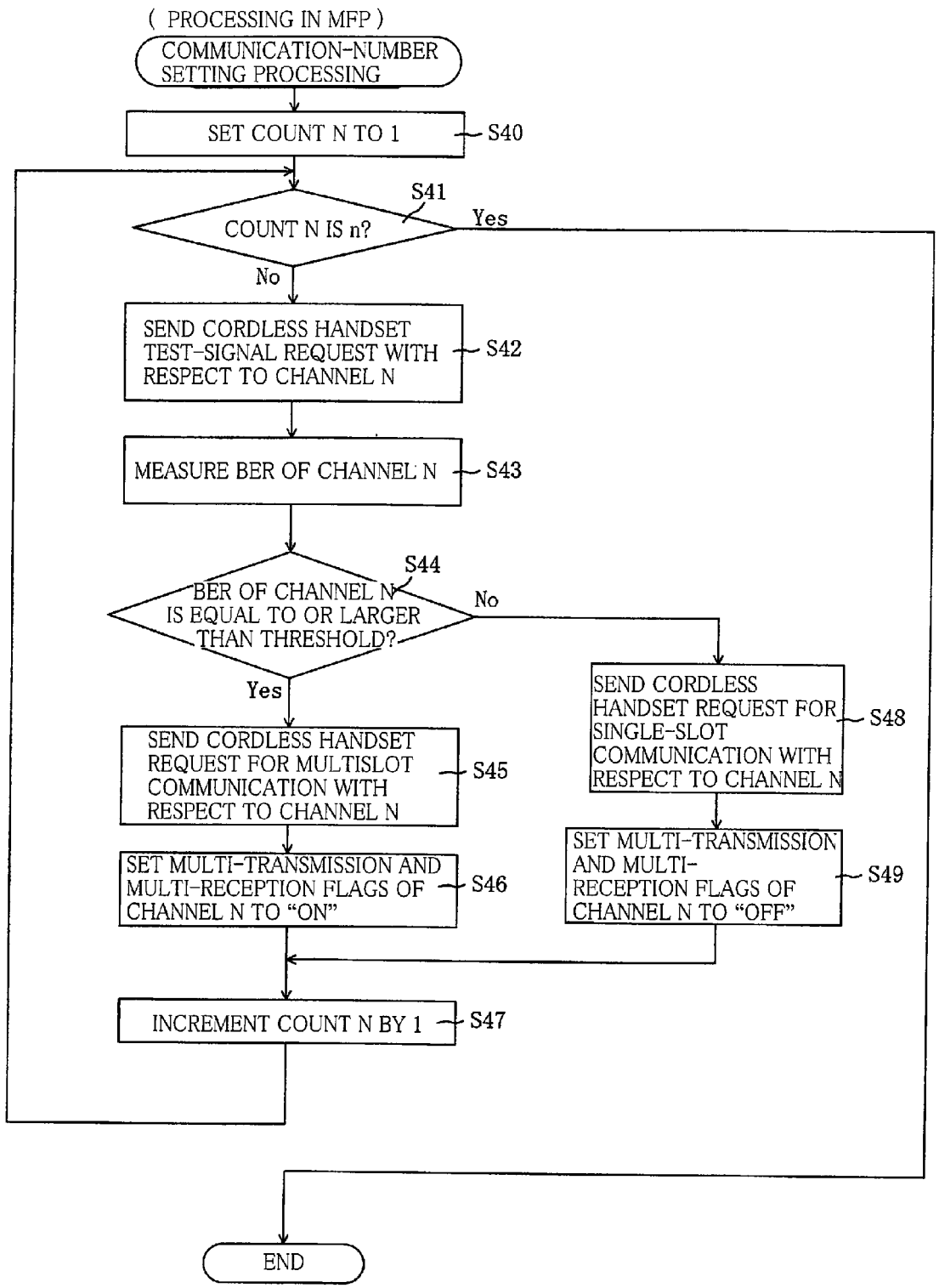
FIG. 4 is a flowchart illustrating a communication-number setting processing implemented in the MFP.

FIG. 4 shows a flowchart illustrating the communication-number setting processing implemented in the MFP 1 in order to determine and set, with respect to each of all the 79 frequency channels, the number of times the MFP 1 repeatedly sends a same data piece to the cordless handset 31 during the wireless communication therebetween.

This processing begins with step S40 in which a count N of a channel counter is set to 1. N represents a number assigned to a channel that is an object of detection of the BER, that is, a number assigned to one of all the 79 channels used for the wireless communication and constituted by first to nth channels, with respect to which channel the BER is to be detected. The setting the count N to 1 means setting the first channel, or the channel numbered 1, as the object of the BER detection.

The processing flow then goes to step S41 to determine whether the BER detection is complete with respect to all the 79 channels, that is, whether the count N of the channel counter is n. When the count N is not n, as in this specific example, a negative decision (NO) is made in step S41, and the processing flow goes to step S42 in which a request for transmission of a test signal (which will be referred to as "test-signal request") with respect to the channel N as the object of the BER detection (which will be referred to as "object channel N") is sent to the cordless handset 31.

In the following step S43, the cordless handset 31 sends the test signal to the MFP 1, and the BER is detected or measured with respect to the object channel on the basis of the received test signal. In the next step S44, it is determined whether the measured BER is equal to or larger than a predetermined threshold (e.g., 1/1000). When the measured BER is equal to or larger than the threshold, an affirmative decision (YES) is made in step S44, the processing flow goes to step S45 in which a request for multislot communication with respect to the channel N, i.e., the channel numbered 1 in this specific example, is sent to the cordless handset 31, and then to step S46 in which the multi-transmission flag 13$b$N and the multi-reception flag 13$a$N with respect to the object channel N, i.e., the multi-transmission flag 13$b$1 and the multi-reception flag 13$a$1 in this specific example, are set to "ON".

That is, the object channel N is determined to be such that the BER value thereof is equal to or larger than the threshold and thus the quality of a communication made therethrough is poorer than a reference value. Hence, it is set such that when the object channel N is used for a wireless communication with the cordless handset 31, each data piece is sent twice.

When the detection of the BER for the object channel N is complete in this way, the processing flow goes to step S47 in which the count N of the channel counter is incremented by 1 so as to next detect the BER with respect to the next channel. Then, the processing of step S41 and the following steps are repeated.

On the other hand, when it is determined in step S44 that the BER value detected or measured with respect to the object channel N (i.e., the channel numbered 1 in this specific example) is smaller than the threshold, that is, when an affirmative decision (YES) is made in step S44, the processing flow goes to step S48 to send the cordless handset 31 a request for single-slot communication with respect to the object channel N, and then to step S49 to set the multi-transmission flag 13$b$N and the multi-reception flag 13$a$N with respect to the object channel N, i.e., the multi-transmission flag 13$b$1 and the multi-reception flag 13$a$1 in this specific example, are set to "OFF". Then, the processing flow goes to step S47.

That is, the object channel N is determined to be such that the BER value thereof is smaller than the threshold and thus the quality of a communication made therethrough is better than the reference value. Hence, it is set such that when the object channel N is used for a wireless communication with the cordless handset 31, each data piece is sent once.

When the above-described detection of the BER value is complete for all of the 79 channels, in other words, when the count N of the channel counter becomes n, an affirmative decision (YES) is made in step S41, and the processing of this cycle is terminated.

Figure 5:
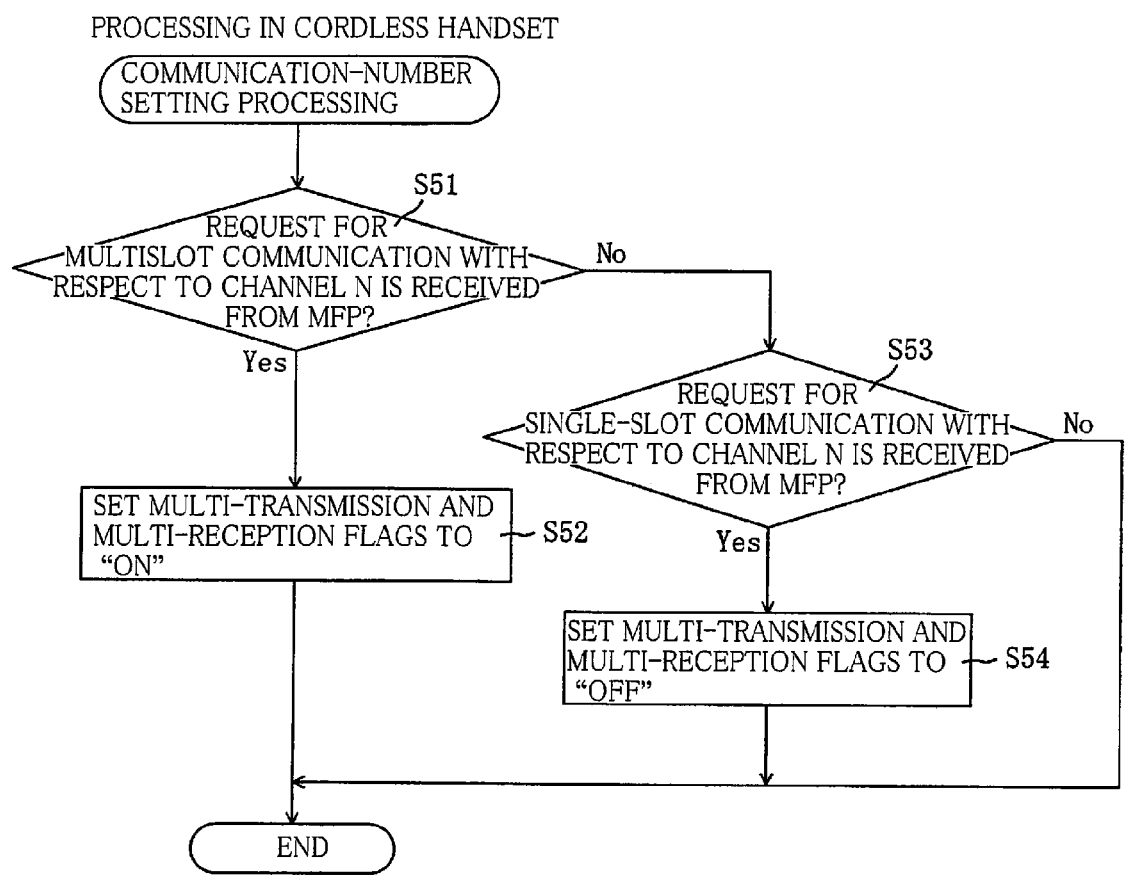
FIG. 5 is a flowchart illustrating a communication-number setting processing implemented in the cordless handset.

FIG. 5 shows a flowchart illustrating a communication-number setting processing implemented in the cordless handset 31 in order to determine and set the multi-transmission and multi-reception flags 34$a$1-34$a$n, 34$b$1-34$b$n of the cordless handset 31 to one of "ON," and "OFF", in response to the request for multislot or single-slot communication sent from the MFP 1 as the base unit.

This communication-number setting processing in the cordless handset 31 begins with step S51 in which it is determined whether a request for multislot communication is received from the MFP 1 as the apparatus at the other end.

When it is determined in step S51 that a request for multislot communication is received, that is, when an affirmative decision (YES) is made in step S51, the processing flow goes to step S52 to set to "ON" the multi-transmission and multi-reception flags 34$a$N, 34$b$N in the cordless handset 31 for the object channel N currently in question, and the processing flow of this cycle is terminated.

On the other hand, when it is determined in step S51 that a request for multislot communication is not received, that is, when a negative decision (NO) is made in step S51, the processing flow goes to step S53 to determine whether a request for single-slot communication is received from the MFP 1 as the apparatus at the other end. When it is determined in step S53 that a request for single-slot communication is received, that is, when an affirmative decision (YES) is made in step S53, the processing flow goes to step S54 to set to "OFF" the multi-transmission and multi-reception flags 34$a$N, 34$b$N in the cordless handset 31 for the object channel N currently in question. On the other hand, when it is determined in step S53 that a request for single-slot communication is not received, that is, when a negative decision (NO) is made in step S53, the processing flow of this cycle is terminated.

In this way, the same numbers of times a data piece is transmitted and received through each channel as set in the MFP 1 can be set in the cordless handset 31. Hence, the quality of the wireless communication between the MFP 1 and the cordless handset 31 is excellent.

Figure 6B:
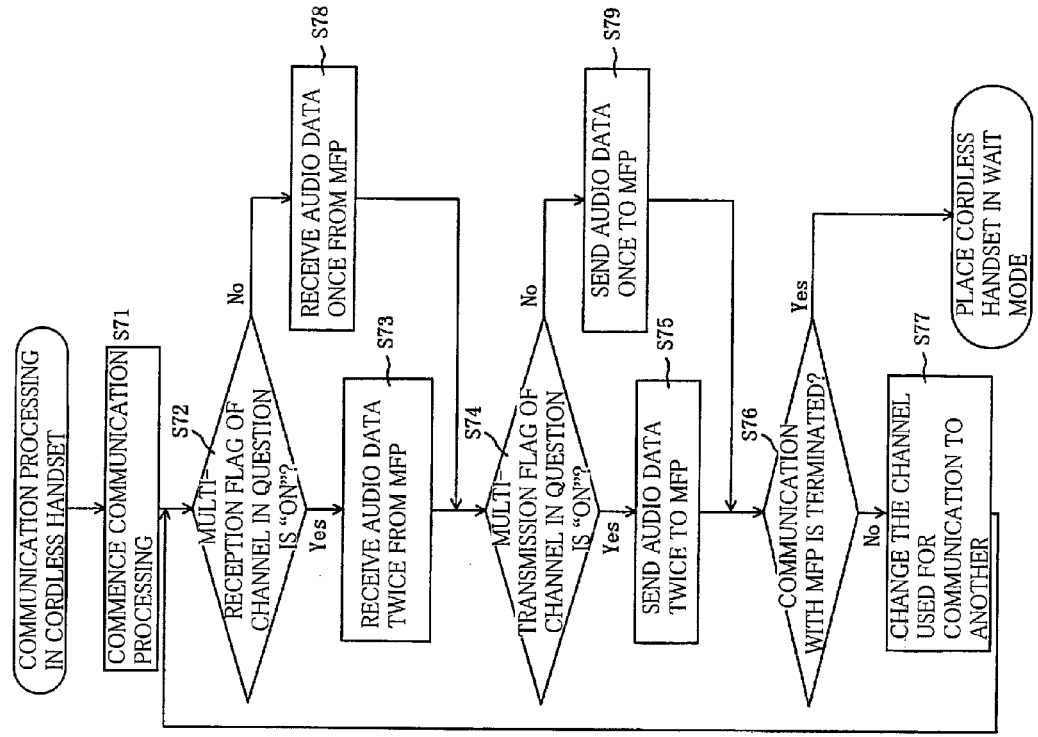
FIG. 6B is a flowchart illustrating a communication processing implemented in the cordless handset.
Figure 6A:
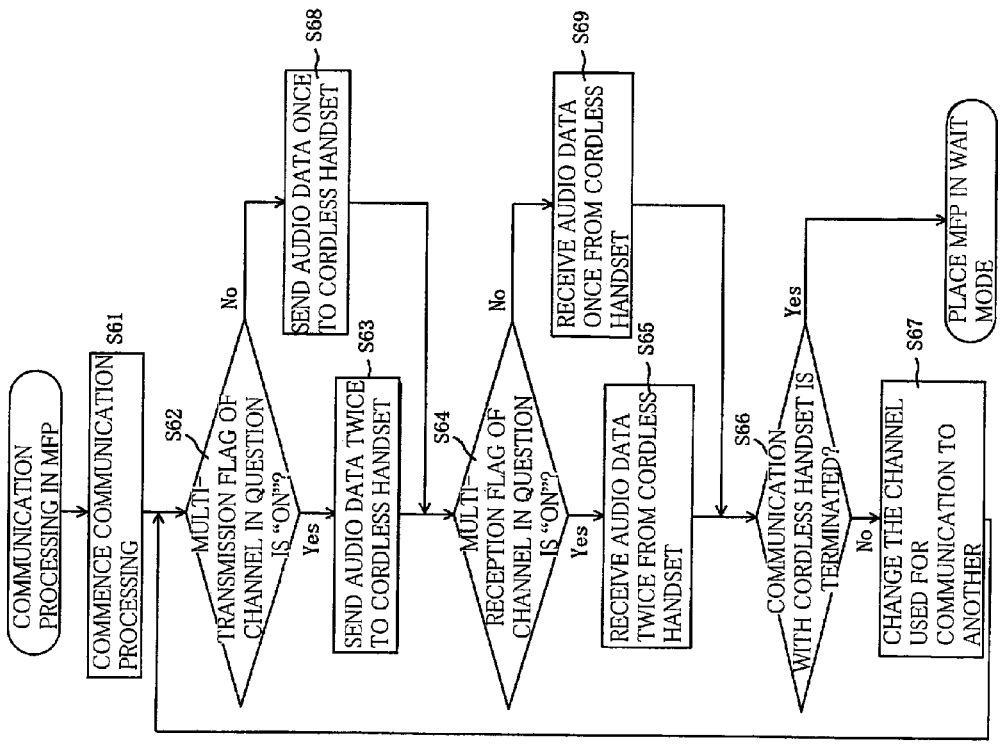
FIG. 6A is a flowchart illustrating a communication processing implemented in the MFP.

FIG. 6A shows a flowchart illustrating a communication processing implemented in the MFP 1 when a wireless communication is made between the MFP 1 and the cordless handset 31. FIG. 6B shows a flowchart illustrating a communication processing implemented in the cordless handset 31 when a wireless communication is made between the MFP 1 and the cordless handset 31.

It is noted that the wireless communication between the MFP 1 and the cordless handset 31 is implemented by the FHSS method, and the communication processings shown in FIGS. 6A and 6B are implemented in the MFP 1 and the cordless handset 31 in synchronization with each other.

The communication processing at the MFP 1 shown in FIG. 6A is implemented mainly by the first digital-cordless-communication control portion 26. This processing is activated when the cordless handset 31 sends a request for commencement of a communication to the MFP 1 in response to a request for connection received from the MFP 1, or when the MFP 1 sends a request for commencement of a communication to the cordless handset 31 in response to a request for connection received from the cordless handset 31.

The request for connection is sent from the MFP 1 to the cordless handset 31 when the user makes the "off-hook" operation to the MFP 1 and presses down the communication start button that is disposed in the first manual operation portion 15 for enabling a speech communication with the cordless handset 31. The request for connection is sent from the cordless handset 31 to the MFP 1 when the user makes the "off-hook" operation to the cordless handset 31 and presses down the communication start button that is disposed in the second manual operation portion 36 for enabling a speech communication with the MFP 1. The request for commencement of a communication is sent from the cordless handset 31 to the MFP 1 when the user makes the "off-hook" operation to the cordless handset 31 and presses down the communication start button disposed in the second manual operation portion 36. The request for commencement of a communication is sent from the MFP 1 to the cordless handset 31 when the user makes the "off-hook" operation to the MFP 1 and presses down the communication start button disposed in the first manual operation portion 15.

The present communication processing in the MFP 1 begins with step S61, in which initial settings of a wireless communication by the FHSS method are made, and it is started to convert an analog audio signal inputted from the base handset 24 into digital audio data and sequentially record the digital audio data to a transmission buffer (not shown) in the RAM 13, and to sequentially record digital audio data received from the cordless handset 31 to a reception buffer (not shown) in the RAM 13.

In the following step S62, it is referred to whether the current value of the multi-transmission flag 13*b* for the channel currently in question (i.e., one of the first to nth multi-transmission flags 13*b*1-13*bn*) is "ON". When the value of the multi-transmission flag 13*b* is "ON", an affirmative decision (YES) is made in step S62, and the processing flow goes to step S63 to twice send the audio data in question from the transmission buffer to the cordless handset 31.

On the other hand, when it is determined in step S62 that the value of the multi-transmission flag 13*b* referred to is "OFF", that is, when a negative decision (NO) is made in step S62, the processing flow goes to step S68 to once send the audio data in question from the transmission buffer to the cordless handset 31.

After either of steps S62 and S68, the processing flow goes to step S64 in which it is referred to whether the current value of the multi-reception flag 13*a* for the channel currently in question (i.e., one of the first to nth multi-reception flags 13*a*1-13*an*) is "ON". When the value of the multi-reception flag 13*a* is "ON", an affirmative decision (YES) is made in step S64, and the processing flow goes to step S65 to twice receive same audio data from the cordless handset 31 through the channel currently in question, record the two data pieces of the same audio data to the reception buffer, and select a non-erroneous one of the two data pieces, which selected one is converted into an analog audio signal which is outputted from the base handset 24.

On the other hand, when the value of the multi-reception flag 13*a* is "OFF", a negative decision (NO) is made in step S64, and the processing flow goes to step S69 to only once receive audio data in question from the cordless handset 31 through the channel currently in question, store or record the audio data in the reception buffer, and convert the stored audio data into an analog audio signal which is outputted from the base handset 24.

After either of steps S65 and S69, the processing flow goes to step S66 to determine whether the communication with the cordless handset 31 is terminated. When it is determined in step S66 that the communication with the cordless handset 31 is not terminated yet, that is, when a negative decision (NO) is made in step S66, the processing flow goes to step S67 in which the channel used for the communication is updated or changed to another channel, and then goes back to step S62. On the other hand, when it is determined in step S66 that the communication with the cordless hand set 31 is terminated, that is, when an affirmative decision (YES) is made in step S66, the processing flow of this cycle is terminated and the MFP 1 is placed in a standby mode.

The communication processing at the cordless handset 31 shown in FIG. 6B is implemented mainly by the second digital-cordless-communication control portion 39. Similar to the above-described communication processing at the MFP 1, this processing is activated when the cordless handset 31 sends a request for commencement of a communication to the MFP 1 in response to a request for connection received from the MFP 1, or when the MFP 1 sends a request for commencement of a communication to the cordless handset 31 in response to a request for connection received from the cordless handset 31.

The present communication processing in the cordless handset 31 begins with step S71, in which initial settings of a wireless communication by the FHSS method are made, and it is started to convert an analog audio signal inputted from the microphone connected with the transceiver circuit 38 into digital audio data and sequentially record the digital audio data in a transmission buffer (not shown) in the RAM 34, and to sequentially record digital audio data received from the MFP 1 to a reception buffer (not shown) in the RAM 34.

In the following step S72, it is referred to whether the current value of the multi-reception flag 34*a* for the channel currently in question (i.e., one of the first to nth multi-reception flags 34*a*1-34*an*) is "ON". When the value of the multi-reception flag 34*a* is "ON", an affirmative decision (YES) is made in step S72, and the processing flow goes to step S73 to twice receive same audio data from the MFP 1 through the channel currently in question, record the two data pieces of the same audio data to the reception buffer, and select a non-erroneous one of the two data pieces, which selected one is converted into an analog audio signal which is outputted from the speaker connected with the transceiver circuit 38.

On the other hand, when it is determined in step S72 that the value of the multi-reception flag 34*a* referred to is "OFF", that is, when a negative decision (NO) is made in step S72, the processing flow goes to step S78 to convert audio data sent from the MFP only once through the channel in question and stored in the reception buffer, into an analog audio signal which is outputted from the speaker connected with the transceiver circuit 38.

After either of steps S72 and S78, the processing flow goes to step S74 in which it is referred to whether the current value of the multi-transmission flag 34*b* for the channel currently in question (i.e., one of the first to nth multi-transmission flags 34*b*1-34*bn*) is "ON". When the value of the multi-transmission flag 34*b* is "ON", an affirmative decision (YES) is made in step S74, and the processing flow goes to step S75 to twice send same audio data from the transmission buffer to the MFP 1 through the channel currently in question.

On the other hand, when the value of the multi-transmission flag 34*b* is "OFF", a negative decision (NO) is made in step S74, and the processing flow goes to step S79 to only once send audio data in question from the transmission buffer to the MFP 1 through the channel in question.

After either of steps S75 and S79, the processing flow goes to step S76 to determine whether the communication with the MFP 1 is terminated. When it is determined in step S76 that the communication with the MFP 1 is not terminated yet, that is, when a negative decision (NO) is made in step S76, the processing flow goes to step S77 in which the channel used for the communication is updated or changed to another channel, and then goes back to step S72. On the other hand, when it is determined in step S76 that the communication with the MFP 1 is terminated, that is, when an affirmative decision (YES) is made in step S76, the processing flow of this cycle is terminated and the cordless handset 31 is placed in a standby mode.

As described above, each of the values of the first to nth multi-reception flags 13*a*1-13*an* and the first to nth multi-transmission flags 13*b*1-13*bn* of the MFP 1, and the first to nth multi-reception flags 34*a*1-34*an* and the first to nth multi-transmission flags 34*b*1-34*bn* of the cordless handset 31, is set at one of "ON" and "OFF" on the basis of the BER value detected with respect to the corresponding frequency channel. In accordance with the values of the flags, a communication is made, such that when a frequency channel that ensures a satisfactory communication quality, namely, a communication quality better than the reference value, is used, data is sent and received only once, and when a frequency channel that does not ensure the satisfactory communication quality, same data is sent and received twice and a non-erroneous one of the received two data pieces is outputted. Hence, an excellent communication quality can be maintained without reducing the number of usable channels, i.e., 79 in this specific example.

As apparent from the above description, in the present embodiment, in a case where a portion of the MFP 1 that provides a communication function is assumed as a communication apparatus according to the invention, the wireless communication unit 81 constitutes a first communicator, and the wireless LAN board 60 constitutes a second communicator. Further, the cordless handset 31 and the access point 51 respectively constitute a first other communication apparatus and a second other communication apparatus. The BER detecting circuit 26a constitutes a detector, a portion of the first CPU 11, the first ROM 12, and the first RAM 13 that implements steps S40-S44 and S47 constitutes a determiner, a portion of the first CPU 11, the first ROM 12, and the first RAM 13 that implements steps S45 and S48 constitutes a requester, and a portion of the first CPU 11, the first ROM 12, and the first RAM 13 that implements steps S46, S49, S62, S63 and S68 constitutes a communication controller.

Although there has been described one embodiment of the invention, it is to be understood that the invention is not limited to the details of the embodiment, but may be otherwise embodied with various modifications and improvements that may occur to those skilled in the art, without departing from the scope and spirit of the invention defined in the appended claims.

For instance, in the above-described embodiment a single threshold of the BER value is set to be used in determining the communication quality of the channel. However, the communication quality may be determined by setting a plurality of thresholds in order that data is sent and transmitted a number of times that increases as the communication quality degrades. For instance, as illustrated in FIG. 7, a first threshold, a second threshold, and a third threshold are respectively set at $1/1000$, $1/500$, and $1/100$, and data is sent and transmitted five times when the BER value is equal to or higher than the third threshold, three times when the BER value is lower than $1/100$ and equal to or higher than $1/500$, and twice when the BER value is lower than $1/500$ and equal to or higher than $1/1000$. According to this arrangement, a further excellent communication quality is maintained.

The communication controller may cease to use a frequency channel which is determined to fall within the lowest quality rank. For instance, in another embodiment illustrated in FIG. 8, when the BER value is lower than $1/100$ the MFP 1 and the cordless handset 31 cease to use the frequency channel.

In the above-described embodiments, the result of the communication-number setting processing implemented in the MFP 1 is reflected in the communication-number setting processing implemented in the cordless handset 31. However, the communication-number setting processings may be implemented vice versa. That is, the embodiment may be modified such that the communication-number setting processing shown in FIG. 4 is implemented in the cordless handset 31, and the communication-number setting processing shown in FIG. 5 is implemented in the MFP 1.

In the embodiment, the base unit or MFP 1 and the cordless handset 31 of a digital cordless telephone system are described by way of example as communication apparatuses wirelessly communicating audio data. However, the invention is applicable to a case where a radio apparatus such as transceiver is employed as a communication apparatus.

In the embodiment, the number of times data is sent and received which is made variable is that between the base unit or MFP 1 and the cordless handset 31 of a digital cordless telephone system for wirelessly communicating audio data. However, this technique is applicable to a communication apparatus or communication system that makes a wireless communication using other communication methods than digital cordless telephone technology, e.g., a wireless LAN communication apparatus or a wireless LAN communication system.

Although in the embodiment the access point 51 is used as a device communicating with the MFP 1 through a wireless LAN, other apparatuses or devices capable of a wireless communication through a LAN, e.g., a wireless LAN printer, may be employed instead of the access point 51.

What is claimed is:
1. A communication apparatus comprising:
 a first communicator which communicates with a first other communication apparatus by using a plurality of frequency channels defined within a frequency band while changing a to-be-used frequency from one to another;
 a requester which requests the first other communication apparatus to send a test signal with respect to each of the plurality of frequency channels before the communication apparatus sends a data piece to the first other communication apparatus via the first communicator;
 a parameter detector which detects, with respect to each of the plurality of frequency channels, values of parameters on the basis of a result of receiving the test signal for each of the plurality of frequency channels, each of the values of parameters being for evaluating a quality of a communication between the communication apparatuses by using a corresponding one of the plurality of frequency channels;
 a determiner which determines, on the basis of the values of the parameters for each of the plurality of frequency channels, whether the quality of the communication between the communication apparatuses made by using each of the frequency channels is not less than a first threshold before the communication apparatus sends the data piece to the first other communication apparatus via the first communicator;
 a communication-number setter which sets, with respect to each of the plurality of frequency channels, the number of times the communication apparatus sends the data piece to the first other communication apparatus, and which sets, with respect to each of the plurality of frequency channels, the number of times the communication apparatus receives a receiving-data piece from the first other communication apparatus before the communication apparatus sends that same data piece to the first other communication apparatus by means of the first communicator, wherein:
 the communication-number setter sets the number of times, once for each of the frequency channels determined to have a good-quality frequency channel by the determiner, and a plurality of times for each of the frequency channels determined to have a poor-quality frequency channel by the determiner, the good-quality frequency channel is the frequency channel for which the quality of the communication made using that frequency channel is determined by the determiner to not be less than the first threshold, and the poor-quality frequency channel is the frequency channel for which the quality of the communication made using that frequency channel is determined by the determiner to be less than the first threshold; and a communication controller which, while changing the to-be-used frequency channel from one to another, sends the data piece to the first other communication apparatus by means of the first communicator, once when the number of times for a channel currently in question is set once by the communication-number setter, and repeatedly for the plurality of times, whether erroneous sending occurs or not, when the number of times for the channel currently in question is set the plurality of times by the communication-number setter, wherein the communication controller, while changing the to-be-used frequency channel from one to another, receives the receiving-data piece from the first other communication apparatus by means of the first communicator once when the number of times for the channel currently in question is set once by the communication-number setter, and receives the receiving-data piece repeatedly from the first other communication apparatus the plurality of times when the number of times for the channel currently in question is set the plurality of times by the communication-number setter.

2. The communication apparatus according to claim 1, wherein at least one other threshold is set at a value lower than the first threshold in order that a plurality of regions corresponding to a plurality of quality ranks are defined by the thresholds, wherein the determiner determines which rank the quality of the communication made by using each poor-quality frequency channel falls within, and wherein the communication controller sends the first other communication apparatus the data piece such that the number of times to send the data increases as the quality rank of the poor-quality frequency channel used lowers.

3. The communication apparatus according to claim 2, wherein the communication controller ceases to use a frequency channel which is determined by the determiner to fall within the lowest quality rank.

4. The communication apparatus according to claim 1, wherein the parameter detector detects, as the value of the parameter, a data error rate of the data received from the first other communication apparatus.

5. The communication apparatus according to claim 1, further comprising a second communicator which is different from the first communicator and communicates with a second other communication apparatus by using a frequency channel defined within the frequency band.

6. A communication system including a base unit and a cordless handset at least one of which is constituted by the communication apparatus according to claim 1.

7. A communication system including a base unit and a cordless handset at least one of which is constituted by the communication apparatus according to claim 2.

8. A communication system including a base unit and a cordless handset at least one of which is constituted by the communication apparatus according to claim 3.

9. A communication system including a base unit and a cordless handset at least one of which is constituted by the communication apparatus according to claim 4.

10. A communication system including a base unit and a cordless handset at least one of which is constituted by the communication apparatus according to claim 5.

11. The communication apparatus according to claim 1, wherein the parameter detector repeatedly detects the value of the parameter at predetermined time intervals.

12. A communication apparatus comprising:

a first communicator which communicates with a first other communication apparatus by using a plurality of frequency channels defined within a frequency band while changing a to-be-used frequency from one to another;

a requester which requests the first other communication apparatus to send a test signal with respect to each of the plurality of frequency channels before the communication apparatus sends a data piece to the first other communication apparatus via the first communicator;

a parameter detector which detects, with respect to each of the plurality of frequency channels, values of parameters on the basis of a result of receiving the test signal for each of the plurality of frequency channels, each of the values of parameters being for evaluating a quality of a communication between the communication apparatuses by using a corresponding one of the plurality of frequency channels;

a determiner which determines, on the basis of the values of the parameters for each of the plurality of frequency channels, whether the quality of the communication between the communication apparatuses made by using each of the frequency channels is not less than a first threshold; and a communication-number setter which sets, with respect to each of the plurality of frequency channels, the number of times the first other communication apparatus sends the data piece to the first other communication apparatus, and which sets, with respect to each of the plurality of frequency channels, the number of times the communication apparatus receives a receiving-data piece from the first other communication apparatus before the communication apparatus requests that the first other communication apparatus send that same data piece to the communication apparatus by means of the first communicator, wherein:

the communication-number setter sets the number of times, once for each of the frequency channels determined to have a good-quality frequency channel by the determiner, and a plurality of times for each of the frequency channels determined to have a poor-quality frequency channel by the determiner, the good-quality frequency channel is the frequency channel for which the quality of the communication made using that frequency channel is determined by the determiner to not be less than the first threshold, and the poor-quality frequency channel is the frequency channel for which the quality of the communication made using that frequency channel is determined by the determiner to be less than the first threshold, wherein the requester requests, by means of the first communicator, the first other communication apparatus to send, while changing the to-be-used frequency channel from one to another, the data piece to the communication apparatus, once when the number of times for a channel currently in question is set once by the communication-number setter, and repeatedly for the plurality of times, whether erroneous sending occurs or not, when the number of times for the channel currently in question is set the plurality of times by the communication-number setter, and wherein the communication controller, while changing the to-be-used frequency channel from one to another, receives the receiving-data piece from the first other communication apparatus by means of the first communicator, once when the number of times for the channel currently in question is set once by the communication-number setter, and receives the receiving-data piece repeatedly from the first other communication apparatus the plurality of times when the number of times for the channel currently in question is set the plurality of times by the communication-number setter.

13. The communication apparatus according to claim 1, wherein the communication controller is configured to convert the received data piece into an audio signal that is output via an output portion when the number of times for the channel currently in question is sent once, and is configured to select a non-erroneous one of the received data pieces and then convert the selected data piece into an audio signal that is output via the output portion when the number of times for the channel currently in question is set to the plurality of times.

* * * * *